United States Patent

[11] 3,613,003

[72] Inventors Mutsuo Kubo; Takeshi Kinoshita, both of Tokyo, Japan

[21] Appl. No. 846,170
[22] Filed July 30, 1969
[45] Patented Oct. 12, 1971
[73] Assignee Tokyo Shibaura Electric Co., Ltd. Kawasaki-shi, Japan
[32] Priority Aug. 5, 1968
[33] Japan
[31] 54914

[54] TRANSCEIVERS WITH CALLING DEVICES
10 Claims, 9 Drawing Figs.

[52] U.S. Cl. 325/18, 325/64, 325/491, 331/59, 340/384
[51] Int. Cl. H04b 1/40
[50] Field of Search 325/18, 19, 20, 21, 22, 55, 64, 491; 340/171, 384 E; 331/177, 179, 59, 137

[56] References Cited

UNITED STATES PATENTS

| | | | |
|---|---|---|---|
| 3,038,070 | 6/1962 | MacDonald | 331/59 X |
| 3,054,971 | 9/1962 | Khu | 331/179 X |
| 3,160,877 | 12/1964 | Monomakhoff | 340/384 E |
| 3,292,085 | 12/1966 | Black | 325/18 |
| 3,339,141 | 8/1967 | Rothenbuhler et al. | 340/171 X |
| 3,488,593 | 1/1970 | Bojo | 325/491 X |
| 2,883,459 | 4/1959 | Roy | 325/18 X |

*Primary Examiner*—Benedict V. Safourek
*Attorney*—George B. Oujevolk

ABSTRACT: In a transceiver provided with a calling device, the circuit constant of an oscillator is varied by means of a switching circuit to generate a call signal of multiple frequencies and the switching circuit is controlled by a control circuit.

TRANSCEIVERS WITH CALLING DEVICES

BACKGROUND OF THE INVENTION

This invention relates to a transceiver with a calling device.

Heretofore, a transceiver was often provided with a device providing a call signal of a single frequency. However, with a call signal of a single frequency, it is not only difficult to identify whether the call signal is sent from a particular remote office or not, but also the sound produced by the call signal is monotonous. On the other hand, a calling device incorporated with relay means and the like to produce a call signal of multiple frequencies is not suitable for use in transceivers because of its large and complicated construction. Although a device has been proposed wherein the oscillation frequency of an oscillator is varied by means of a switching element, such a device has not been actually utilized as the calling device for the transceiver.

SUMMARY OF THE INVENTION

It is an object of this invention to provide a transceiver prepared by a calling device capable of forming a call signal having multiple frequencies thus enabling easy discrimination of calling parties and producing comfortable calling tones.

Briefly stated according to this invention, there is provided a transceiver with a calling device comprising a control signal generator, means for shaping the waveform of a control signal generated by the control signal generator, switching means by a signal shaped by the waveform shaping means, an oscillator and means controlled by the switching means to vary the constant of the oscillation element of the oscillator.

DESCRIPTION OF THE PREFERRED EMBODIMENTS

Figures 1, 2, 3:
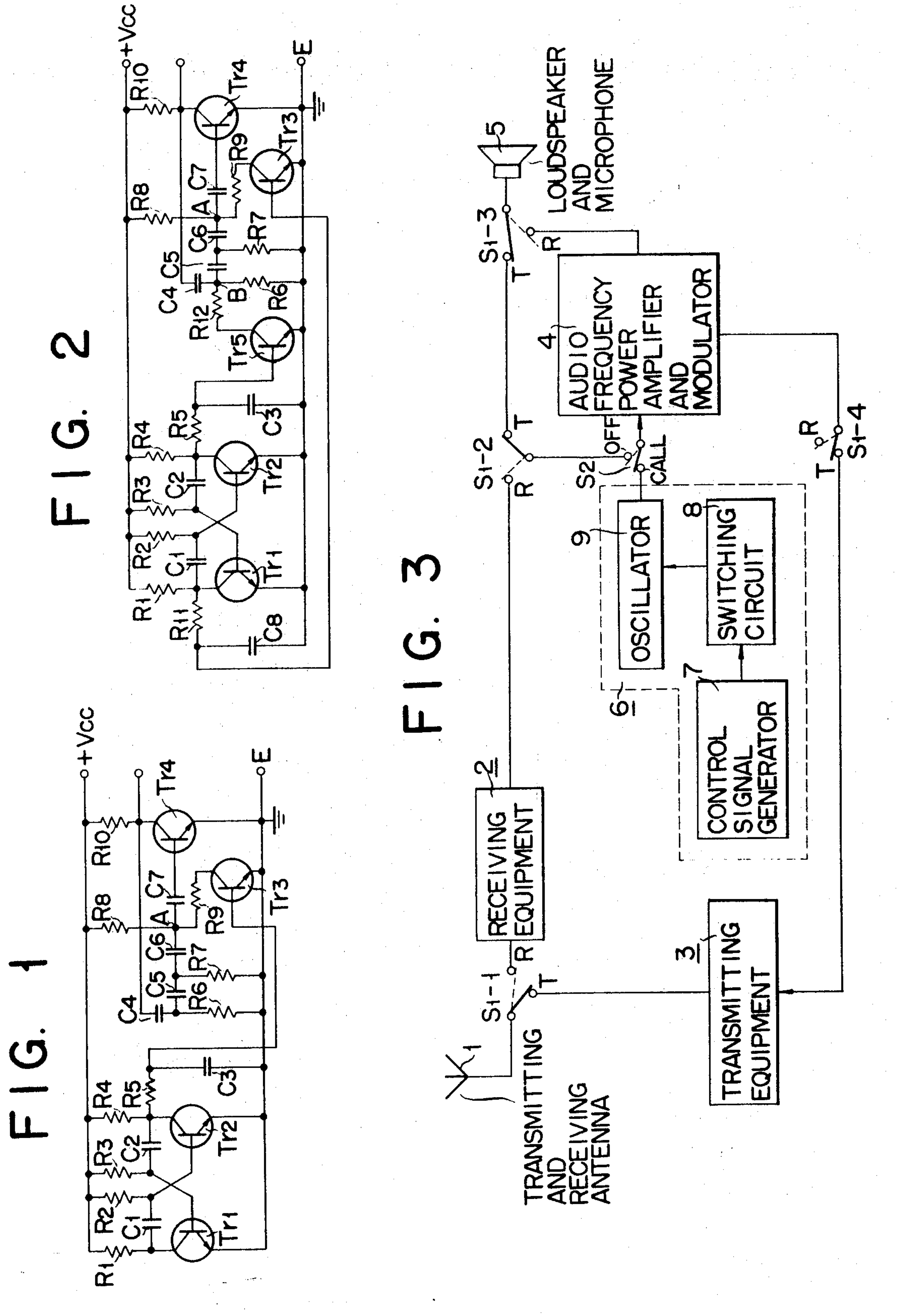
FIGS. 1 and 2 are connection diagrams helpful to explain the principle of this invention.
FIG. 3 illustrates a connection diagram of a transceiver provided with a calling device of the most simple construction.

Referring now to FIG. 1 of the accompanying drawings, transistors $Tr_1$ and $Tr_2$ are connected in an emitter grounded configuration. Collector electrodes of these transistors are connected to a positive source +Vcc respectively through resistors $R_1$ and $R_4$, while their base electrodes to the same source respectively through resistors $R_3$ and $R_2$. A condenser $C_1$ is connected between the collector electrode of transistor $Tr_1$ and the base electrode of transistor $Tr_2$, and a condenser $C_2$ is connected between the collector electrode of transistor $Tr_2$ and the base electrode of transistor $Tr_1$. Thus, these transistors comprise an astable multivibrator circuit. A collector electrode of a transistor $Tr_4$ is connected to the positive source +Vcc via a collector bias resistor $R_{10}$ and a series circuit including a condenser $C_4$ and a resistor $R_6$ is connected between the collector electrode of transistor $Tr_4$ and the ground. The juncture between condenser $C_4$ and resistor $R_6$ is grounded through a series circuit including a condenser $C_5$ and a resistor $R_7$. The juncture between condenser $C_5$ and resistor $R_7$ is connected to the base electrode of transistor $Tr_4$ via serially connected condensers $C_6$ and $C_7$, a juncture A between these condensers being connected to the positive source +Vcc through a resistor $R_8$ and to the collector electrode of a transistor $Tr_3$ via resistor $R_9$.

Both transistors $Tr_3$ and $Tr_4$ are of emitter grounded configuration and the base electrode of transistor $Tr_3$ is connected to the collector electrode of transistor $Tr_2$ via an integrating circuit consisting of a resistor $R_5$ and a condenser $C_3$. In this manner, the circuit associated with transistor $Tr_4$ composes a CR oscillator including a CR phase-shifting circuit, the phase-shifting constant of the CR oscillator being varied by the switching function of transistor $Tr_3$.

In operation, as is well known in the art, the astable multivibrator circuit comprising transistors $Tr_1$ and $Tr_2$ oscillates pulses having a periodic rectangular waveform. By repeating predetermined cycles of operation, transistors $Tr_1$ and $Tr_2$ provide an output pulse of rectangular waveform. By impressing this rectangular waveform pulse to the base electrode of transistor $Tr_3$ through the integrating circuit comprising resistor $R_5$ and condenser $C_3$ a sawtooth waveform will be resulted. Transistor $Tr_3$ alternately becomes ON and OFF with reference to a predetermined level of the sawtooth wave. By ignoring the resistance of the collector-emitter path of transistor $Tr_3$ when it is conductive it may be considered that as if resistors $R_8$ and $R_9$ were connected in parallel between juncture A and the ground. Further, during the OFF state of transistor $Tr_3$ it may be considered that the resistance of the collector-emitter path thereof is very high so that only the resistor $R_8$ is connected between juncture A and the ground. Thus, as the resistance between juncture A and the ground is varied due to alternate ON and OFF operations of transistor $Tr_3$ the constant of the phase-shifting circuit or of the positive feedback circuit of the CR oscillator is varied whereby the oscillator generates an oscillation signal, the frequency of which periodically varies between two frequencies depended upon ON and OFF states of transistor $Tr_3$.

FIG. 2 illustrates a circuit for generating a call signal having three discrete frequencies which is similar to that shown in FIG. 1 except that the output from the astable multivibrator circuit is supplied to switching transistors $Tr_3$ and $Tr_5$ respectively through different integrating circuits.

More particularly, a resistor $R_{11}$ is connected between the collector electrode of transistor $Tr_1$ and the base electrode of transistor $Tr_3$ while a condenser $C_8$ is connected between the base electrode of transistor $Tr_3$ and the ground. Condenser $C_8$ and resistor $R_{11}$ compose a first integrating circuit.

Similarly, a resistor $R_{12}$ is connected between the collector electrode of transistor $Tr_2$ and the base electrode of transistor $Tr_5$ whereas a condenser $C_3$ is connected between the base electrode of transistor $Tr_5$ and the ground. The condenser $C_3$ and resistor $R_5$ compose a second integrating circuit, and across the collector electrode of transistor $Tr_5$ and a juncture B is connected a resistor $R_{12}$ corresponding to a resistor $R_9$ connected to juncture A.

When constructed in the above-described manner, the output from the astable multivibrator functions to render transistors $Tr_3$ and $Tr_5$ alternately ON and OFF.

Consequently, the constant of the phase-shifting circuit adapted to produce the call signal is varied by the following factors.

1. The interval in which transistor $Tr_3$ is ON and transistor $Tr_5$ is OFF. Between juncture A and the ground are connected in parallel resistors $R_8$ and $R_9$ while between juncture B and the ground is connected only resistor $R_6$.

2. The interval in which transistor $Tr_3$ is OFF and transistor $Tr_5$ is not ON, yet.

Between juncture A and the ground is connected only resistor $R_8$ while resistor $R_6$ alone is connected between juncture B and the ground.

3. The interval during which transistor $Tr_3$ is OFF and transistor $Tr_5$ is ON.

Between juncture A and the ground is connected only resistor $R_8$ while resistors $R_6$ and $R_{12}$ are connected in parallel across juncture B and the ground.

4. The interval in which transistor $Tr_5$ is OFF and transistor $Tr_3$ is not ON, yet.

The connection is identical to that of 2.

In this manner, depending upon ON and OFF states of switching transistors $Tr_3$ and $Tr_5$, the phase-shifting constant of the CR oscillator varies in three ways to provide call signals of three frequencies. Similarly, call signals of multiple frequencies can be formed by the same principle. Thus, the calling device is comprised by a source of control signal such as an astable multivibrator, a waveform-shaping circuit for converting a signal from the source of control signal into a waveform signal of various types, such as an integrating circuit, a differentiating circuit and the like, an electronic switching means for effecting switching operation in accordance with the signal shaped by the wave-shaping circuit and oscillator means including a plurality of oscillation elements, the constants thereof being varied by the electronic switching means for determining oscillation frequencies.

Various embodiments of transceivers including calling devices constructed in accordance with the above-described principle will now be described hereunder. Briefly stated, the transceiver shown in FIG. 3 comprises a transmitting and receiving antenna 1, a receiving equipment 2, a transmitting equipment 3, a combined audiofrequency power amplifier and modulator 4, a combined loudspeaker and microphone 5 and a calling device 6. Calling device 6 comprises a control signal generator 7 such as an astable multivibrator, a switching circuit 8 rendered ON and OFF states by a signal supplied from control signal generator 7, and an oscillator 9, the constant of the oscillation elements thereof being varied by the switching circuit 8. Switching between transmission and reception systems is effected by transmission-reception transfer switches $S_1$-1, $S_1$-2, $S_1$-3 and $S_1$-4, while calling operation is effected by a calling switch $S_2$.

The transceiver shown in FIG. 3 operates as follows: First, transmission-reception transfer switches $S_1$-1, $S_1$-2, $S_1$-3 and $S_1$-4 are thrown to the transmission side T and calling switch $S_2$ is thrown to the call side (CALL). Then the call device operates to form a call signal of multiple frequencies as has been discussed in connection with FIGS. 1 and 2. The resulting call signal is supplied to combined audiofrequency power amplifier and modulator 4 through calling switch $S_2$ and the call signal modulated by amplifier-modulator 4 is radiated from antenna 1 of the transmitting equipment 3. After elapse of a predetermined interval of time after transmission of the call signal, switch $S_2$ is opened to transmit a voice signal to the combined audiofrequency amplifier and modulator 4 through combined loudspeaker and microphone 5, transmission-reception transfer switches $S_1$-3, $S_1$-2 and calling switch $S_2$. Also the voice signal is modulated by combined audiofrequency power amplifier and modulator 4 and is then supplied to transmitting equipment 3 through transmission-reception transfer switch $S_1$-4. After being multiplied and amplified in the amplifier-modulator 4, the modulated voice signal is radiated through the air by antenna 1 via transmission-reception transfer switch $S_1$-1. On the receiving party, transmission-reception transfer switches $S_1$-1, $S_1$-2, $S_1$-3 and $S_1$-4 are thrown to the reception side R and calling switch $S_2$ to the off side. A transmitted radio wave is received by antenna 1 and is supplied to receiving equipment 2 through transmission-reception transfer switch $S_1$-1. After being detected by receiving equipment 2, a received signal is conducted for amplification to a combined audiofrequency power amplifier and modulator 4 through transmission-reception transfer switch $S_1$-2, and calling switch $S_2$. The amplified signal is supplied via transmission and reception transfer switch $S_1$-3 to combined speaker-microphone 5 which gives forth a calling tone and sequentially a voice. Therefore the receiving party is allowed to identify the transmitting party by distinguishing the calling signal and communicate therewith.

Figure 4:
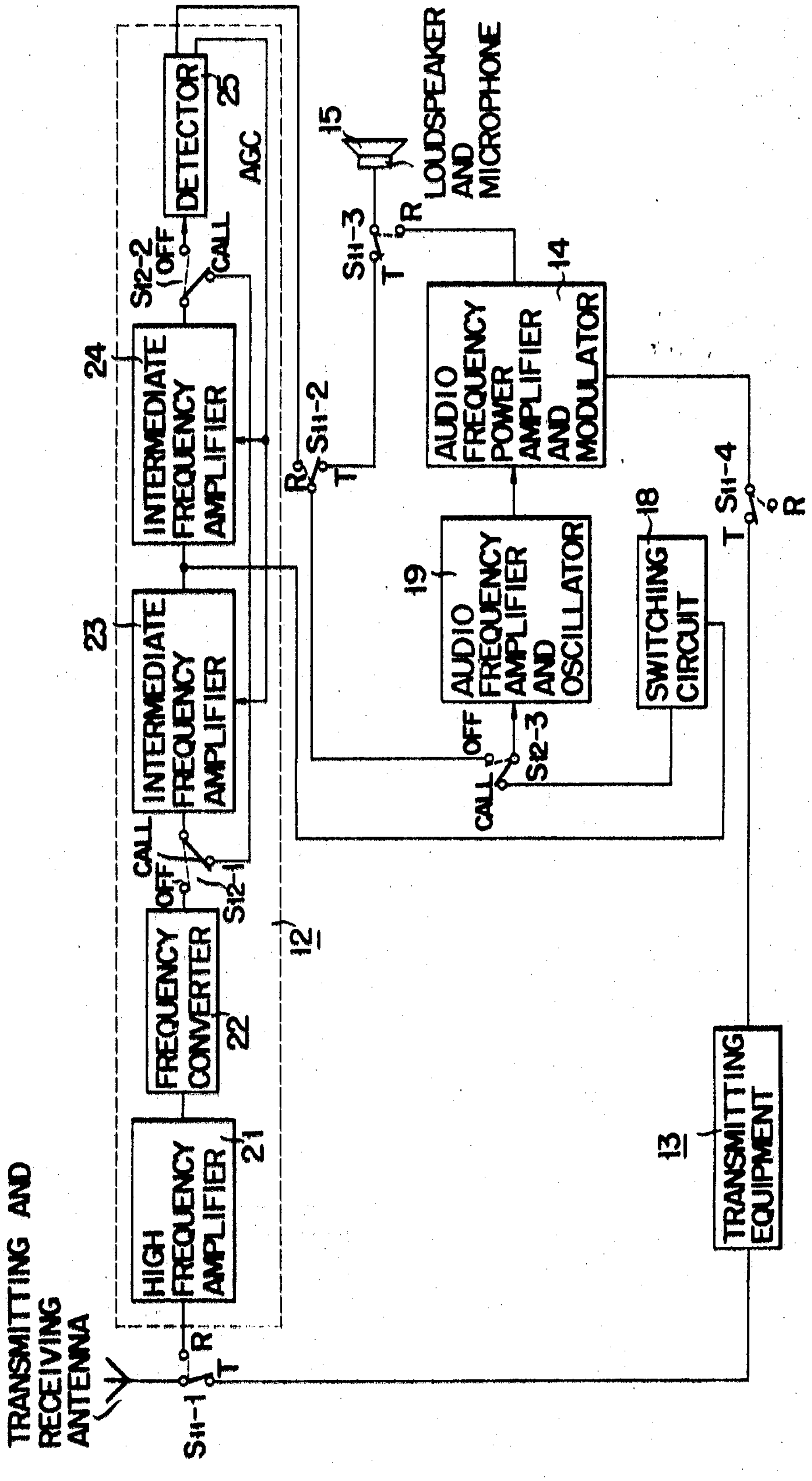
FIG. 4 shows a connection diagram of a modified embodiment of this invention wherein a source of control signal for the calling device is formed by a portion of the circuit of receiving equipment.

FIG. 4 shows a modified embodiment of this invention wherein instead of providing an independent control signal source for the calling device, the control signal source is comprised by a portion of the circuit of the receiving equipment. The transceiver shown in FIG. 4 comprises a transmitting and receiving antenna 11, a receiving equipment 12, a transmitting equipment 13, a combined audiofrequency power amplifier and modulator 14, a combined loudspeaker and microphone 15, a switching circuit 18, and a combined audiofrequency amplifier and oscillator 19. The switching operation between the transmitting and receiving equipments effected by transmission-reception transfer switches $S_{11}$-1, $S_{11}$-2, $S_{11}$-3 and $S_{11}$-4 while the operation of the calling device is performed by calling switches $S_{12}$-1, $S_{12}$-2 and $S_{12}$-3. Receiving equipment 12 is of the well-known superheterodyne type comprising a high-frequency amplifier 21, a frequency converter 22, a first and a second intermediate-frequency amplifiers 23 and 24 and a detector 25. Generally, a handy transmitter and receiver such as a transceiver is of the press talk type operated by a pushbutton so that during transmission the receiving equipment is inoperative. Accordingly it is constructed such that intermediate-frequency amplifiers 23 and 24 may be used as the control signal generator included in the transmitting equipment. More specifically, upon throwing calling switches $S_{12}$-1 and $S_{12}$-2 to the call side, intermediate-frequency amplifiers 23 and 24 are changed into a control signal generator whereas when call switches $S_{12}$-1 and $S_{12}$-2 are opened they act as the intermediate-frequency amplifiers. Further, the oscillator 19 of the calling device is constructed such that it is used not only during calling but also during reception as the audiofrequency amplifier by throwing transmission-reception transfer switch $S_{11}$-2 and calling switch $S_{12}$-3 to the reception side R and off side respectively.

Figure 5:
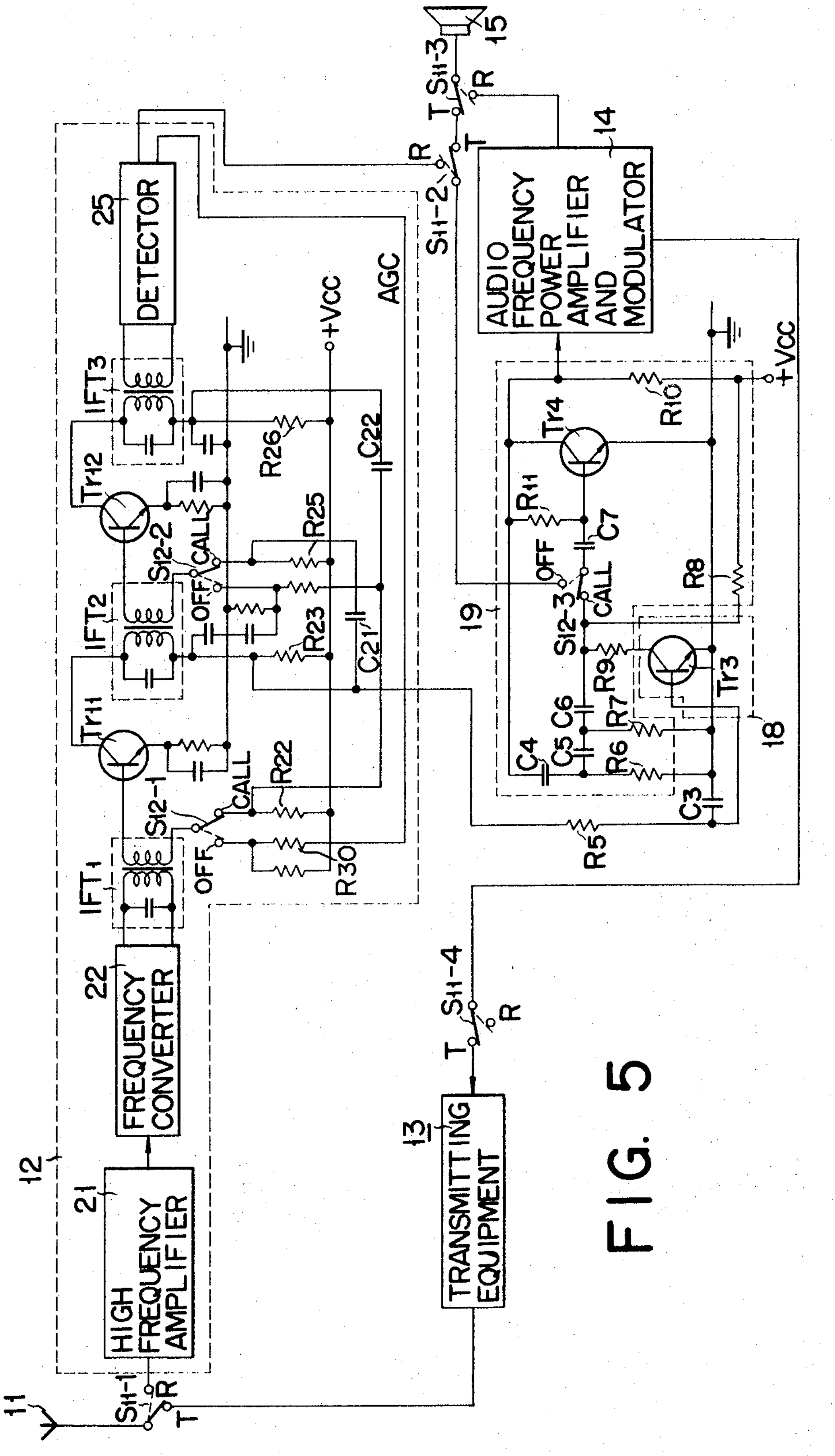
FIG. 5 is a circuit diagram showing the detail of a portion of the transceiver shown in FIG. 4.

FIG. 5 shows the detail of the essential portion of the transceiver shown in FIG. 4. Particularly, circuits associated with transistors $Tr_{11}$ and $Tr_{12}$ compose a combined intermediate-frequency amplifier and control signal generator. More particularly, when calling switches $S_{12}$-1 and $S_{12}$-2 are thrown to the call side, resistors $R_{22}$ and $R_{25}$ are connected to act as the base bias resistors of transistors $Tr_{11}$ and $Tr_{12}$, respectively, so that they correspond to resistors $R_2$ and $R_3$ in the astable multivibrator circuit shown in FIG. 1.

Further, condenser $C_{21}$ connected between an intermediate-frequency transformer $IFT_2$ and calling switch $S_{12}$-2 corresponds to condenser $C_1$ connected between the collector electrode of transistor $Tr_1$ and the base electrode of transistor $Tr_2$ of the astable multivibrator circuit shown in FIG. 1. Similarly, condenser $C_{22}$ connected between an intermediate-frequency transformer $IFT_3$ and calling switch $S_{12}$-1 corresponds to condenser $C_2$ shown in FIG. 1. During the receiving operation while intermediate-frequency transformers $IFT_1$, $IFT_2$ and $IFT_3$ operate normally, during calling operation they manifest a low impedance so that they do not contribute in any way to operate as oscillator elements.

Since, the switching circuit shown in FIG. 5 is identical with that shown in FIG. 1, corresponding elements are designated by the same reference characters. However, in FIG. 5 between resistor $R_8$ and condenser $C_7$ is included a calling switch $S_{12}$-3 which when opened renders the circuit associated with transistor $Tr_4$ to operate as an audiofrequency amplifier.

The operation of the circuits shown in FIGS. 4 and 5 is as follows: First, transmission-reception transfer switches $S_{11}$-1, $S_{11}$-2, $S_{11}$-3 and $S_{11}$-4 are thrown to the transmission side T and then calling switches $S_{12}$-1, $S_{12}$-2 and $S_{12}$-3 are thrown to the call side. Then the circuit associated with transistors $Tr_{11}$ and $Tr_{12}$ operates as the control signal generator and the signal generated thereby is supplied to the switching transistor $Tr_3$ via the integrating circuit comprising resistor $R_5$ and condenser $C_3$.

As a result, switching transistor $Tr_3$ repeats ON and OFF operations to vary the constant of the oscillation elements of the circuit of transistor $Tr_4$ comprising a CR oscillator, thus providing a calling signal having two frequencies. This calling signal is modulated by the combined audiofrequency power amplifier and modulator 14 and is then applied to the transmitting equipment 13 via transmission-reception transfer switch $S_{11}$-4. After being multiplied and amplified in the transmitting equipment the modulated calling signal is radiated into the air from transmitting and receiving antenna 11 via transmission-reception transfer switch $S_{11}$-1. On the transmitting party, following the calling signal the voice signal is supplied to the base electrode of transistor $Tr_4$ from combined loudspeaker and microphone 15 via transmission-reception transfer switches $S_{11}$-3, $S_{11}$-2 and calling switch $S_{12}$-3. After being amplified by transistor $Tr_4$, the voice signal is then coupled to combined audiofrequency power amplifier and modulator 14 and is then radiated from combined transmitting and receiving antenna 11 through transmission-reception transfer switch $S_{11}$-4, transmitting equipment 13 and transmission-reception transfer switch $S_{11}$ -1 in the same manner as the calling signal. On the receiving party, the electromagnetic wave is received by the combined transmitting and receiving antenna 11 and after being detected by the receiving equipment 12, the received signal is supplied to the combined loudspeaker and microphone 15 through transmission-reception transfer switch $S_{11}$-2, calling switch $S_{12}$-3, combined audiofrequency amplifier and oscillator 19, combined audiofrequency power amplifier and modulator 14 and transmission-reception transfer switch $S_{11}$-3. It is also possible to constitute a modification of the circuit shown in FIG. 5 by using the principle circuit shown in FIG. 2, which provides a call signal of three frequencies.

Figure 6:
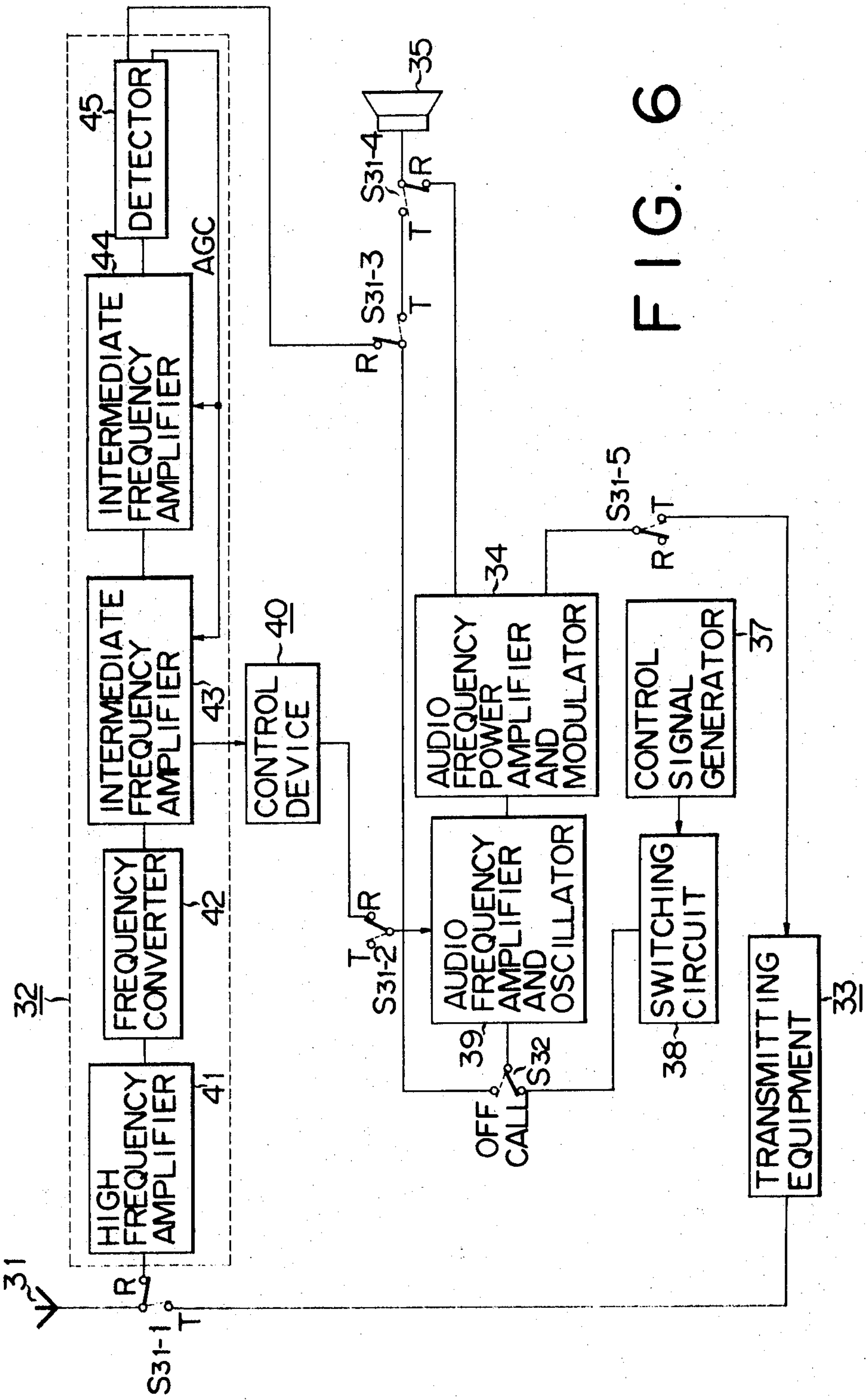
FIG. 6 is a block diagram of a further modification of this invention.

In still further modification shown in FIG. 6 the transceiver comprises a combined transmitting and receiving antenna 31, a receiving equipment 32, a transmitting equipment 33, a combined audiofrequency power amplifier and modulator 34 and a combined loudspeaker and microphone 35 and the switching between transmitting and receiving equipment is effected by the operation of transmission-reception transfer switches $S_{31}$-1, $S_{31}$-2, $S_{31}$ -3, $S_{31}$-4 and $S_{31}$-5. Similar to FIG. 5, the receiving equipment 32 comprises a high-frequency amplifier 41, a frequency converter 42, intermediate-frequency amplifiers 43 and 44 and a detector 45, the intermediate-frequency amplifier 43 being connected to a control device 40, which in turn is connected to a combined audiofrequency amplifier and oscillator 39 via transmission-reception transfer switch $S_{31}$-2 to control the operation of the combined audiofrequency amplifier and oscillator 39. Further, a control signal generator 37 is connected to a switching circuit 38 connected to a combined audiofrequency amplifier and oscillator 39. The switching operation of the calling device is performed by a calling switch $S_{32}$.

Figure 7:
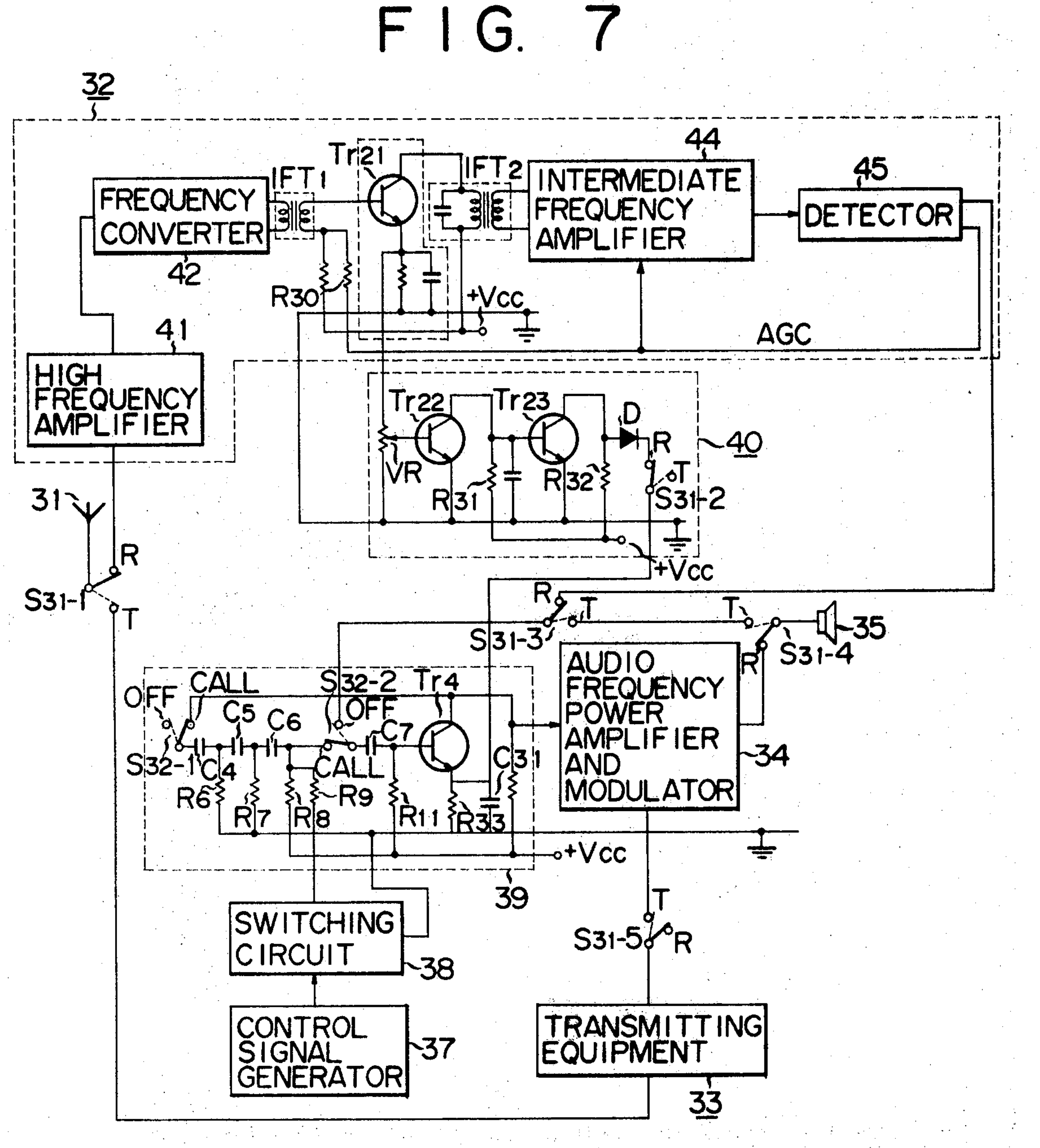
FIG. 7 shows the details of a portion of the circuit shown in FIG. 6.

FIG. 7 shows the detail of a portion of the circuit shown in FIG. 6. The emitter electrode of transistor $Tr_{21}$ forming the intermediate-frequency amplifier 43 shown in FIG. 6 is connected to the control device 40. Control device 40 comprises switching transistors $Tr_{22}$ and $Tr_{23}$ and a diode D and operates to control the combined audiofrequency amplifier and oscillator 39. More particularly, the emitter electrode of transistor $Tr_{21}$ is grounded through a variable resistor VR, a movable terminal thereof being connected to the base electrode of transistor $Tr_{22}$.

Both transistors $Tr_{22}$ and $Tr_{23}$ are of the emitter grounded configuration while the collector electrode of transistor $Tr_{22}$ is directly coupled to the base electrode of transistor $Tr_{23}$ and to the positive source +Vcc via a collector bias resistor $R_{31}$. The collector electrode of the other transistor $Tr_{23}$ is connected to the source +Vcc via a collector bias resistor $R_{32}$ and to diode D which in turn is connected to the emitter electrode of transistor $Tr_4$ forming the combined audiofrequency amplifier and oscillator 39. A parallel circuit comprising a resistor $R_{33}$ and a condenser 31 is connected between the emitter electrode of transistor $Tr_4$ and the ground. One of the output terminals of detector 45 is connected to the first intermediate-frequency transformer $IFT_1$ through a resistor $R_{30}$ so as to form an automatic gain control circuit AGC. Control device 40 is preset by variable resistor VR such that when the voltage of the AGC circuit is at a predetermined magnitude the voltage of the emitter electrode of transistor $Tr_{21}$ will decrease to turn off transistor $Tr_{22}$ whereby the combined audiofrequency amplifier and oscillator 39 is actuated by the AGC circuit. In the absence of any received input, since AGC circuit produces no voltage, transistor $TR_{22}$ is turned ON whereas transistor $Tr_{23}$ is turned OFF due to the voltage drop across resistor $R_{31}$. Nonconduction of transistor $Tr_{23}$ applies a forward bias to diode D and a current is caused to flow through emitter resistor $R_{33}$ of transistor $Tr_4$ through the transmission-reception transfer switch $S_{31}$-2 to cut off the operation of the combined audiofrequency amplifier and oscillator 39.

As will be described later in detail the function of control device is analogous to that of a squelch circuit commonly utilized in an FM receiver or a receiver with an AGC in order to avoid extremely large noise which appears on the output side of the receiver when received input signal disappears. In the presence of a received input (Only the carrier wave is sufficient). the calling signal having multiple frequencies is generated by the loudspeaker so that during an interval in which there is received input the audiofrequency amplifier is rendered operative to send out the voice signal through the loudspeaker.

The circuits shown in FIGS. 6 and 7 operate as follows:

1. The calling operation wherein, on the transmitting party, the calling switch $S_{32}$ is thrown to the call side CALL, transmission-reception transfer switch $S_{31}$ to transmission side T, while on the receiving party calling switch $S_{32}$ is thrown to the off side OFF, and the transmission-reception switch is thrown to the reception side R.

Under these conditions, on the transmitting party, the condition of switching circuit 38 is altered by a signal from control signal generator 37 to cause combined audiofrequency amplifier and oscillator 39 to form the required calling signal. This calling signal is modulated by the combined audiofrequency power amplifier and modulator 34, multiplied and amplified by transmitter equipment 33 through transmission-reception transfer switch $S_{31}$-5 and is then radiated into the air from combined transmitting and receiving antenna via transmission-reception transfer switch $S_{31}$-1.

On the receiving party, the electromagnetic wave sent from the transmitting party is received by antenna 31 and supplied to receiving equipment 32 through transmission-reception transfer switch $S_{31}$-1. In the receiving equipment 32, high-frequency amplification, intermediate-frequency amplification and detection operations are performed. Accordingly, the calling signal sent from the transmitting party and the AGC signal appear across output terminals of detector 45. The call signal is supplied to the base electrode of transistor $Tr_4$ forming combined audiofrequency amplifier and oscillator 39 through transmission-reception transfer switch $S_{31}$-3, calling switch $S_{32}$-2 and condenser $C_7$. As the AGC signal is applied to the base electrode of transistor $Tr_{21}$ forming an intermediate-frequency amplifier through resistor $R_{30}$ so that the emitter voltage of transistor $Tr_{21}$ will be decreased. Consequently, input voltage to control device 40 is decreased to turn off transistor $Tr_{22}$. This causes to decrease the voltage drop across resistor $R_{31}$ connected to the collector electrode of transistor $Tr_{22}$ with the result that the base potential of transistor $Tr_{23}$ is increased to turn on the same. As has already been explained, before forming the AGC signal transistor $Tr_{23}$ is in its OFF state so that current flows to the emitter bias circuit (a parallel circuit of resistor $R_{33}$ and condenser $C_{31}$) of transistor $Tr_4$ from source +Vcc via resistor $R_{32}$, diode D and transmission-reception transfer switch $S_{31}$-2. Thus, the transistor $Tr_4$ is maintained in its nonconductive condition by the voltage drop across resistor $R_{33}$. However, when transistor $Tr_{23}$ is rendered conductive by the AGC signal, current flows from source +Vcc to transistor $Tr_{23}$ through resistor $R_{32}$, thus turning on transistor $Tr_4$. Therefore, the call signal applied to the base electrode of transistor $Tr_4$ is amplified and is further subjected by power amplification provided by combined audiofrequency power amplifier and modulator 34 in the next stage. The amplified call signal is applied to combined loudspeaker and microphone 35 to generate the calling tone. A receiving party, who hears this calling tone identifies the particular calling party to reply to him.

2. The calling operation wherein, on the transmitting party, calling switch $S_{32}$ is thrown to OFF side, and transmission-reception switch $S_{31}$ to transmission side T, while on the receiving party, calling switch $S_{32}$ is thrown to CALL side and transmission-reception switch $S_{31}$ to reception side R.

On the transmission side combined audiofrequency and oscillator 39 operates as an audiofrequency amplifier and in the absence of any input to the combined loudspeaker and microphone 35, the output from the combined audiofrequency amplifier and modulator 34 does not contain any modulated input with the result that only the carrier wave will be multiplied and power amplified by transmitting equipment 33 to radiate the carrier wave into the air from transmitting and receiving antenna.

On the receiving party this wave is received by transmission and receiving antenna 31, and is then subjected to high-frequency amplification, frequency conversion, intermediate-frequency amplification and detection operations in the receiving equipment 32, and only the AGC signal is produced across output terminals of detector 45 in the receiving equipment 32. Similar to the case (1) this AGC signal actuates control device 40 to turn on transistor $Tr_4$ of the combined amplifier and oscillator 39. At this time, since calling switch $S_{32}$ on the receiving party is thrown to CALL side, the combined audiofrequency amplifier and oscillator 39 operates as an oscillator. As a result, the condition of the switching circuit 38 is varied according to the signal produced by control signal generator 37 so that combined audiofrequency amplifier and oscillator 39 operates to form a predetermined call signal which is applied to combined loudspeaker and microphone 35 through combined power amplifier and modulator 34, and transmission-reception transfer switch $S_{31}$-4 to produce a calling tone. In this case, it is impossible to discriminate the remote party by the calling tone. However, where a communication system for a particular remote party has already been established such identification can be made in an effective manner. Further, different from prior apparatus, with this system it is possible to produce a comfortable calling tone with a simple construction.

3. The calling operation wherein, on the transmitting party, calling switch $S_{32}$ is thrown to the CALL side, transmission-reception transfer switch $S_{31}$ to the transmission side T, while on the receiving party calling switch $S_{32}$ is thrown to the CALL side, transmission-reception transfer switch $S_{31}$ to reception side R.

In this case, the transmitting party operates in the same manner as in case (1) while the receiving party operates in the same manner as in case (2). Similar to case (2), again it is impossible to discriminate the remote party but upon receiving the calling tone, the receiving party can immediately respond by merely throwing transmission-reception transfer switch $S_{31}$ to the transmission side T without the necessity of operating the calling switch $S_{32}$. It may be possible to determine which one of above-described calling operations (1), (2) and (3) should be selected and such selection may be made depending upon the condition of the propagation. In any calling operation, control device operates in a manner similar to a squelch circuit so that the loudspeaker does not generate any undesirable noise during waiting time.

Figure 8:
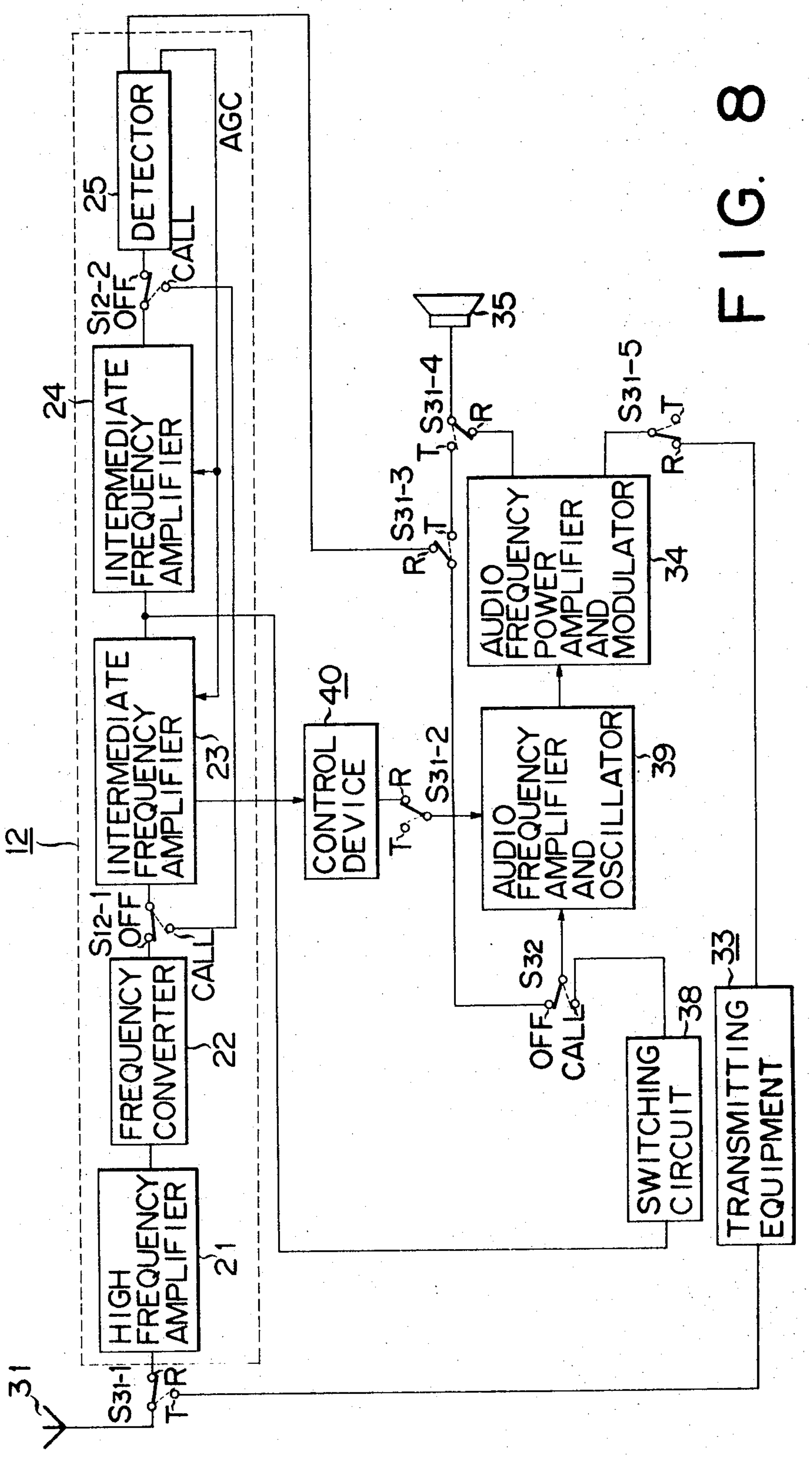
FIG. 8 is a block diagram of a still further modification of this invention.
Figure 9:
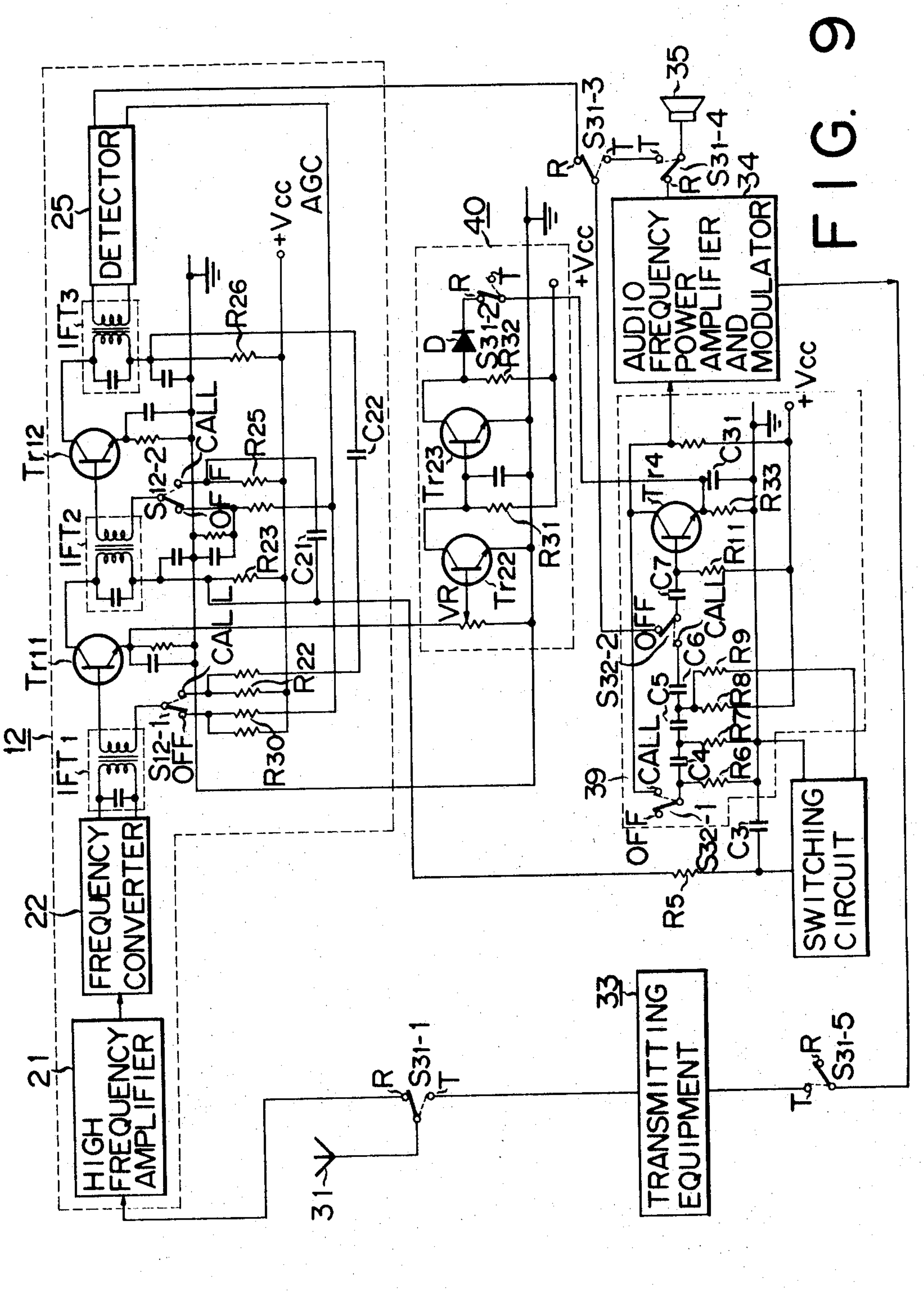
FIG. 9 shows the details of a portion of the circuit shown in FIG. 8.

FIG. 8 is the block diagram and FIG. 9 represents the concrete circuit arrangement of a still further embodiment of this invention, in which the control signal generator 37 in the embodiments shown in FIGS. 6 and 7 is constructed using, as shown in FIGS. 4 and 5, first and second intermediate-frequency amplifiers 23 and 24, which are not required at the receiving time. Referring to FIGS. 8 and 9, the same parts of receiving equipment 12 as those of the similar equipment of FIGS. 4 and 5 are denoted by the same reference numerals and the parts of other equipments than said receiving equipment 12 are represented by the same reference numerals as are used in FIGS. 6 and 7 and concrete description thereof is omitted.

In the embodiments of FIGS. 8 and 9, the transceiver is practicable only in the case where on the transmitting party calling switches $S_{12}$-1, $S_{12}$-2, $S_{32}$-1 and $S_{32}$-2 are thrown to the CALL side and a transmission-reception transfer switch $S_{31}$ is thrown to the transmission side T and on the receiving party calling switches $S_{12}$-1, $S_{12}$-2, $S_{32}$-1 and $S_{32}$-2 are thrown to the OFF side and transmission-reception transfer switch $S_{31}$ is thrown to the receiving side R. Accordingly, it is not possible to derive the calling tone of the receiving party from the combined loudspeaker and microphone 35 as in FIGS. 6 and 7, thus eliminating the necessity of providing any extra control signal generator.

Therefore, this invention provides a transceiver including a calling device capable of forming a call signal of multiple frequencies with simple construction thus enabling easy identification of the remote calling party. Further, as the call signal comprises multiple frequencies it is possible to produce comfortable tone, in some case constituting a unique melody.

What is claimed is:

1. A transceiver comprising:

a. a transmitting and receiving antenna;

b. receiving equipment means connected to said antenna receiving a transmitted signal through said antenna, said receiving equipment comprising a cascade connection of a high-frequency amplifier, a frequency converter, a first and second intermediate-frequency amplifier and a detector;

c. transmitting equipment means connected to said antenna transmitting a signal via said antenna;

d. a transmission-reception transfer switch including a reception side and a transmission side according to a receiving time and a transmitting time connected to supply a bias voltage to said receiving or transmitting equipment means;

e. a calling device including an output terminal generating a call signal of multiple tones consisting of a control signal formed using said receiving equipment, a switching circuit including ON or OFF condition controlled by said control signal, and an oscillation circuit including oscillation elements connected to said switching circuit in which the constant of the oscillation elements is varied by said switching circuit;

f. a calling switch at said output terminal with a CALL side, thrown to the CALL side at the calling time to operate said calling device;

g. a combined audio amplifier and modulator having an input terminal connected to the output terminal of said calling device including amplifying and modulating means performing an amplifying operation at the receiving time and a modulating operation at the transmitting time; and h. a combined loudspeaker and microphone connected to said combined audio amplifier and modulator, from which a calling tone and voice is derived at the receiving time and to which a voice is supplied at the transmitting time.

2. The transceiver according to claim 1 wherein said control signal generator of said calling device is so adapted and disposed as to use said first and second amplifiers, and said oscillation circuit is so adapted and disposed as to operate as an audiofrequency amplifier at the receiving time.

3. The transceiver according to claim 2, including an CR integrating circuit between said control signal generator and said switching circuit, wherein said switching circuit comprises a first transistor to the base of which there is supplied an output signal from said integrating circuit to control said first transistor to an ON or OFF condition, and said oscillator comprises a CR phase shift circuit whose impedance is varied to two values in accordance with the ON or OFF condition of said transistor and a second transistor, so as to oscillate a call signal of two frequencies.

4. The transceiver according to claim 3, including a second integrating circuit wherein said switching circuit comprises a third and fourth transistor, the base of each of which is supplied with an output signal from said first and second integrating circuits respectively to control said transistor to an ON or OFF condition, and said oscillator comprises a CR phase shift circuit whose impedance is varied to three values in accordance with the ON or OFF condition of said transistors, so as to oscillate a call signal of three frequencies.

5. The transceiver according to claim 1 wherein said control signal generator of said calling device comprises an astable multivibrator constructed using a transistor involved in said first and second intermediate-frequency amplifiers respectively and an integral circuit shaping the waveform of an output signal from said multivibrator.

6. The device according to claim 1 wherein said receiving equipment comprises a cascade connection of a high-frequency amplifier, a frequency converter, a first and second intermediate-amplifier and a detector so as to form an AGC circuit transferring an AGC signal derived from the output terminal of said detector to the input terminal of said first intermediate-frequency amplifier, said control signal generator of said calling device comprises an astable multivibrator and an integral circuit shaping the waveform of an output signal from said multivibrator, said switching circuit comprises a first transistor to the base of which there is supplied an output signal from said integral circuit to control said transistor to an ON or OFF condition, said oscillator comprises a CR phase shift oscillator whose impedance is varied according to the ON or OFF condition of said transistor and a second transistor, thereby to oscillate a call signal of multifrequencies and operate as an audiofrequency amplifier at the receiving time, said transceiver further comprising a control device having an input terminal connected to said first intermediate-frequency amplifier and an output terminal connected to said combined audiofrequency amplifier and oscillator only at the receiving time, and performing such a squelch operation as stops the operation of said audiofrequency amplifier when there does not appear said AGC signal.

7. The transceiver according to claim 6 wherein said astable multivibrator of said control signal generator is constructed using a transistor involved in said respective intermediate amplifiers.

8. A transceiver comprising:

a. a transmitting and receiving antenna;

b. receiving equipment means connected to said antenna receiving a transmitted signal through said antenna, said receiving equipment comprising a cascade connection of a high-frequency amplifier, a frequency converter, a first and second intermediate amplifier and a detector so as to transfer a detecting signal derived from the output terminal of said detector to the input terminal of said first intermediate frequency amplifier;

c. transmitting equipment means connected to said antenna transmitting a signal via said antenna;

d. a transmission-reception transfer switch including a reception side and a transmission side according to a receiving time and a transmitting time connected to supply a bias voltage to said receiving or transmitting equipment means;

e. a calling device including an output terminal generating a call signal of multiple tones consisting of a control signal generator generating a control signal, a switching circuit controlled to an ON or OFF condition by said control signal, and an oscillation circuit including oscillating elements connected to said switching circuit, in which the constant of the oscillation elements is varied by said switching circuit;

f. a calling switch at said output terminal with a CALL side, thrown to the CALL side at the calling time to operate said calling device;

g. a combined audio amplifier and modulator having an input terminal connected to the output terminal of said calling device including amplifying and modulating means, performing an amplifying operation at the receiving time and a modulating operation at the transmitting time;

h. a control device having an input terminal connected to said first intermediate-frequency amplifier and an output terminal connected to said combined audiofrequency amplifier and oscillator only at the receiving time, and performing such a squelch operation as stops the operation of said audiofrequency amplifier when there does not appear said detecting signal; and, i. a combined loudspeaker and microphone connected to said combined audio amplifier and modulator, from which a calling tone and voice is derived at the receiving time and to which a voice is supplied at the transmitting time.

9. The transceiver according to claim 8, wherein said control signal generator of said calling device comprises an astable multivibrator and an integrating circuit shaping the waveform of an output signal from said multivibrator, said switching circuit comprises a first transistor to the base of which there is supplied an output signal from said integrating circuit to control said transistor to an ON or OFF condition, said oscillator comprises a CR phase shift oscillator whose impedance is varied according to the ON or OFF condition of said transistor and a second transistor, thereby to oscillate a call signal of multifrequencies and operate as an audio frequency amplifier at the receiving time.

10. The transceiver according to claim 8, wherein said astable multivibrator of said control signal generator is so adapted and disposed as to use said respective intermediate amplifiers.